US006293174B1

(12) United States Patent
Rulseh

(10) Patent No.: US 6,293,174 B1
(45) Date of Patent: Sep. 25, 2001

(54) QUICK CHANGE DRIVE FOR CORE CUTTERS

(75) Inventor: Tim Rulseh, Neenah, WI (US)

(73) Assignee: Productive Solutions, Inc., Neeham, WI (US)

(*) Notice: Subject to any disclaimer, the term of this patent is extended or adjusted under 35 U.S.C. 154(b) by 0 days.

(21) Appl. No.: 08/695,213

(22) Filed: Jul. 29, 1996

Related U.S. Application Data

(60) Provisional application No. 60/001,874, filed on Aug. 3, 1995.

(51) Int. Cl.[7] ........ B23B 5/08

(52) U.S. Cl. ........ 82/113; 82/123; 82/128; 82/160

(58) Field of Search ........ 82/101, 113, 58, 82/70.1, 72, 73, 89, 90, 96, 102, 123, 128, 54, 57, 160; 83/54; 409/233; 192/69, 71, 72, 79.1, 108; 279/2.14, 2.15, 2.12

(56) References Cited

U.S. PATENT DOCUMENTS

| | | | |
|---|---|---|---|
| 1,012,657 | * 12/1911 | Kurschus | 192/69.92 |
| 1,345,458 | * 7/1920 | Pierce | 82/58 |
| 1,435,511 | * 11/1922 | Sutherland | 279/2.12 |
| 1,736,700 | * 11/1929 | Davis | 82/58 |
| 2,084,801 | * 6/1937 | Hall | 409/233 |
| 2,615,644 | * 10/1952 | Enz | 279/2.12 X |
| 3,017,207 | * 1/1962 | Lloyd | 403/1 |
| 3,500,976 | * 3/1970 | Halley | 192/29 |
| 3,818,797 | * 6/1974 | Zettler | 409/233 |
| 3,951,018 | * 4/1976 | Gilmore | 82/113 |
| 5,026,223 | * 6/1991 | Hunt | 409/233 |
| 5,458,031 | * 10/1995 | Wolff | 82/70.1 X |
| 5,555,783 | * 9/1996 | Pienta | 82/101 X |

FOREIGN PATENT DOCUMENTS

| | | | |
|---|---|---|---|
| 000276245 | * 2/1990 | (DE) | 279/2.12 |

* cited by examiner

*Primary Examiner*—Henry Tsai
(74) *Attorney, Agent, or Firm*—Russell L. Johnson

(57) ABSTRACT

A core drive for internal drive core cutters having a non-rotating pull rod and a rotating drive plate. The core drive has a rotating element assembly that releasably couples to the drive plate and a non-rotating element assembly that is secured to the pull rod with a quick release securement. The drive is mated with a pusher so that the drive and pusher kit can be interchangeable with kits of other diameters to enable the quick changing of a mandrel to cut a core of a different diameter.

8 Claims, 5 Drawing Sheets

QUICK CHANGE DRIVE FOR CORE CUTTERS

CROSS-REFERENCES TO RELATED APPLICATIONS

This application claims the benefits of Provisional Patent application No. 60/001,874, filed Aug. 03, 1995.

This invention relates to internal drive core cutters.

More particularly, this invention relates to quick change drive assemblies for internal drive core cutters.

FIELD OF THE INVENTION

Still more particularly, this invention relates to the drive assemblies described above wherein the assemblies permit the quick changing of a core cutter drive assembly and associated components, so as to permit the cutting of cores of different diameters by means of changing the drive assemblies and their associated core cutting components.

Internal drive core cutters derive their names from the fact that they engage the inside of cores in order to rotate them during the cutting operation.

A typical internal drive core cutter mandrel has a non-rotating central pull rod, a drive unit that rotates on the pull rod and a non-rotating outer sleeve that encloses the drive unit except at parts of its proximal end where the drive unit engages a core drive train, and at its distal end where a drive plate engages a core drive assembly.

The core drive assembly is made up of a rotating component that engages the drive unit and carries expandable grippers that engage the inside of a core and a fixed component that is secured to the pull rod and a cone structure which urges the grippers into contact with a core when the pull rod is translated so as to cause the cone structure to force the grippers outward. The typical core drive has as a part thereof, a cutting pad against which a core cutting knife works to effect a core cut off. The core cutting knife is usually circular and may rotate or be fixed. The cutting pad may also rotate or be non-rotating.

Core stock is formed as long cylindrical tubes. The core stock is mounted on long mandrels which are a part of core cutting machines which perform the tasks associated with cutting cores to the desired lengths. On internal drive core cutters, the interior of the core stock is engaged by a core drive attached to the distal end of the mandrel, and the core is rotated past a core cutting knife which moves into the core stock to sever a core of the desired length from the core stock. In the past, it was common practice for a user to have a separate core cutting mandrel for each diameter of core to be cut in his work. In recent times, manufacturers of core cutting machinery have provided multiple mandrel core cutting machines which permit the employment of one machine to cut cores of more than one diameter on the same machine without requiring a time consuming change-over.

The art has long been in need of a quick and low cost means for converting a core cutting mandrel to accomodate to a range of diameters of cores to be cut.

The frequency of cycling of high stress loads, both static and dynamic, on internal core drives, and the limitations of space inside the core to be cut make it difficult to maintain the elements of the core drive in reliable operating condition. Therefore, it is common practice in the art to build the core drive onto the end of the mandrel so as to, in effect, make the core drive a part of the mandrel. Heretofore, the art has not provided an internal drive core drive that can be attached and removed from a core cutting mandrel as a unit.

It is, therefore, an object of this invention to provide quick change core drive mechanisms for internal drive core cutters.

It is further an object of this invention to provide the mechanisms described above wherein a drive mechanism of one diameter may be quickly exchanged for a drive mechanism of another diameter.

It is further an object of this invention to provide the mechanisms described above wherein components that need to be changed with a change in the core diameter, are maintained in association with the above described drive mechanisms so as to provide an assembled kit which facilitates the conversion of a core cutting mandrel from one core drive to another.

Other objects will become apparent from the following specifications, drawings and claims.

DESCRIPTION OF THE RELATED ART

The core cutting art is replete with drive mechanisms for internal drive core cutters. The inventor does not know of any such drives that can be characterized as quick change drive mechanisms. The cone mechanisms that are a part of this invention are found in the core cutter art and abound in the core gripper and roll handling and roll chuck art.

The prior art provides machines that have multiple mandrels of different sizes to facilitate the cutting of cores of different sizes.

It is known in the art to exchange a mandrel of one size on a machine for a mandrel of another size in order to facilitate the cutting of cores of different sizes. Typically the exchange requires the use of skilled tradesmen and typically requires about 45 minutes to accomplish.

It is further known in the art to rebuild the core drive of a mandrel to accept a core of a different size in order to facilitate the cutting of cores of different diameters. Typically the rebuilding of a core drive of a mandrel requires the services of a skilled tradesman and typically requires about 15 minutes to accomplish.

In counter-distinction, a quick change core drive unit of this invention can be exchanged for a similar quick change core drive of a different diameter in less than one minute by a machine operator.

SUMMARY OF THE INVENTION

This invention is a quick change core drive mechanism for internal drive core cutters having a fixed central pull rod and a drive unit that is rotatable around said pull rod and comprising: a core drive assembly having a rotating mechanism and a non-rotating mechanism, and the rotating mechanism is engageable with said drive unit and said non-rotating mechanism is engageable with said pull rod. The means for engaging the rotating mechanism is typically a male-female coupling which is engageable and disengageable by sliding the core drive assembly along the pull rod. The means for engaging the non-rotating mechanisms with the pull rod is typically a spring clip, or a pull pin, or a spring loaded "saber" style coupling.

A core pusher which supports the proximal end of a length of core stock and serves to advance the core stock to position the core stock for cut-off may be provided with a magnetic coupling element so that when the pusher comes in contact with the rotating element of the core drive mechanism, it becomes magnetically coupled therewith.

The core drive assembly and the pusher may be provided with an encasement that serves as a storage means for the core drive assembly and its associated pusher as well as serving as an aid to the quick assembly and disassembly of the core drive and pusher with a core cutter mandrel.

DESCRIPTION OF THE PREFERRED EMBODIMENTS

Figure 1:
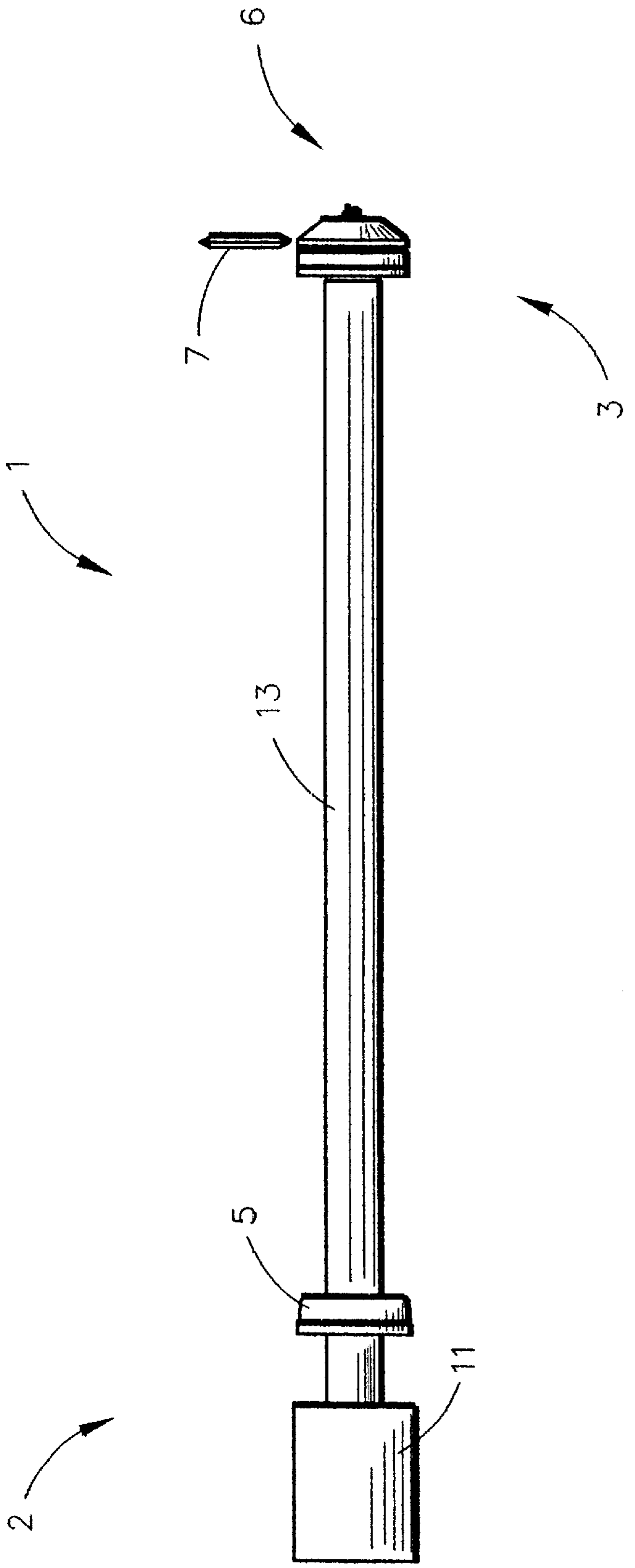
FIG. 1 is an elevational view of a core cutting mandrel showing a core drive assembly of this invention in an operating position on the mandrel.

The term "unit" as used herein shall be read to mean "an assembly of components that is joined together so as to become manipulatable as if it were a single component".

In the drawings like numbers refer to like objects and the proportions of some elements have been changed to facilitate illustration.

The end of the core cutter mandrel nearest the drive shall herein be called the proximal end and the end of the mandrel to receive the core drive assembly shall herein be called the distal end.

Proportions and placements of some elements have been modified to facilitate illustration and disclosure. Some non-critical elements have been omitted or simplified to facilitate illustration and disclosure.

Figure 2:
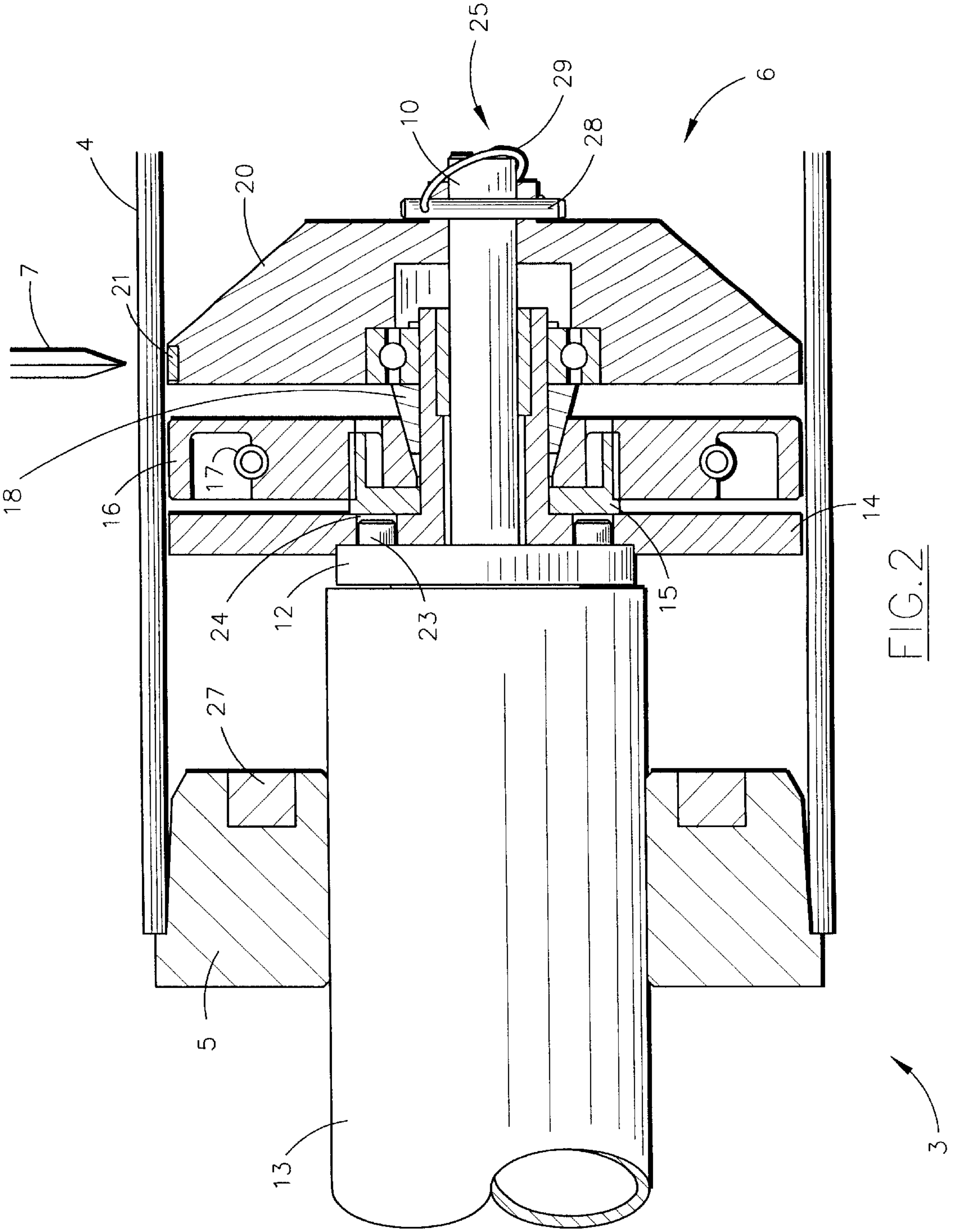
FIG. 2 is a sectioned elevational view showing the relationship of the core drive components of this invention.

Referring now to FIGS. 1 and 2 wherein a preferred embodiment of the invention is shown. Core cutter mandrel 1 has a proximal end 2 and a distal end 3. Proximal end 2 typically provides the drive for the core cutter while distal end 3 is the cut-off end of the core cutter.

Core cutter mandrels are found in a range of lengths, with mandrels of 12 feet and more not uncommon. The core cutting process involves the steps of; mounting an elongate tube of core stock 4 onto a mandrel 1 with the proximal end of core stock 4 supported by pusher 5 and the distal end of core stock 4 supported by core drive mechanism 6, engaging internal core drive mechanism 6 to rotate the core stock 4, advancing a knife 7 into core stock 4, severing a segment of core stock 4, disengaging core drive mechanism 6, advancing core stock 4 the desired distance and repeating the operation.

Internal drive core cutting mandrels typically have a central non-rotating pull rod 10 onto which a central rotating drive unit is mounted having a power input 11 at its proximal end 2 and a drive element 12 at its distal end 3. The drive unit is enclosed by a non-rotating mandrel sleeve 13. Heretofore, a set of rotating elements of a core drive mechanism was fixed to a drive element 12 and a set of non-rotating elements of a core drive mechanism was fixed to a pull rod 10. The elements of the core drive unit were essentially built on to the distal end of the mandrel and were for all practical purposes a part of the mandrel construction. This method of construction necessitated the provision of a separate mandrel for each diameter of core to be cut.

FIG. 2 will serve to illustrate the relationships between the rotating and non-rotating elements of an internal core drive mechanism and as a derivative thereof, make it apparent to one skilled in the mechanical arts, why it is seen as desirable to be able to remove and attach all of the elements of a core drive as a unit or kit.

The rotating elements of core drive mechanism 6 are; coupling plate 14, gripper guide 15, grippers 16, resilient ring 17 and cone element 18. The non-rotating elements are; end cap 20, cutting pad 21, and quick release fastener 25.

In the configuration of FIG. 2, pull rod 10 is inserted into drive mechanism 6 and screw heads 23 secured to drive element 12 are inserted into receivers 24 in coupling plate 14 thereby coupling core drive mechanism 6 with drive element 12. Quick release fastener 25 here shown as a pin 28 having a pull ring 29 secured thereto, is then employed to secure end cap 20 to pull rod 10 as shown in FIG. 1.

As will be illustrated in more detail below, the constructions that are suitable for driving large diameter cores are not practical or even serviceable for driving small diameter cores. Therefore, it should be understood that the configurations shown herein are representative of configurations that this invention may be given and not definitive of a specific configuration required for the practice of this invention.

In the configuration of FIG. 2, core stock 4 is positioned for cutting by pusher 5 being advanced, pull rod 10 is drawn towards drive element 12 thereby causing cone element 18 to urge grippers 16 outward into engagement with core stock 4. Core stock 4 is thereby rotated past knife 7. Knife 7 is advanced towards pad 21 to cut off a core segment of the desired length. For reasons not germane to this invention it is sometimes desirable to have knife 7 rotate and it is sometimes desirable to have knife 7 be non-rotating. Pad 21 serves to back up knife 7 when it reaches the inside diameter of the core stock and thereby serves to prevent a broken or ragged inside edge on the cut off core.

Pusher 5 of FIG. 2 is preferably made of ultra high molecular weight polyethylene (UHMWPE) which has a high lubricity and serves as a self lubricating bearing. Pusher 5 is provided with a magnetic element 27 which serves two functions in the configuration of FIG. 2. First the magnet holds pusher 5 in contact with coupling plate 14 when pusher 5 is at the distal end of its travel. Pusher 5 is thereby held in place for receiving a new length of core stock 4 and pusher 5 can be detached from coupling plate 14 by pressure exerted by core stock 4 during the process of loading core stock 4 on mandrel 1. Second, magnetic element 27 serves to maintain pusher 5 in contact with coupling plate 14 during mounting and removing of core drive mechanism 6, so that core drive mechanism 6 and pusher 5 can be attached to and detached from mandrel 1 as a unit or as a kit of parts.

The quick release core drive mechanism of FIGS. 1 and 2 will serve well for internal drive core cutters for cores of relatively large diameters. For cores of relatively small diameters, the mechanisms of FIGS. 1 and 2 are difficult or impossible to fabricate so that they are suitable for application to cores of smaller diameters. The concepts of this invention serve well for core cutters for the smaller diameters of cores, but physical geometries that are better suited for use with the limitations and opportunities that are present due to the smaller diameters of cores to be cut are preferred.

Figure 3:
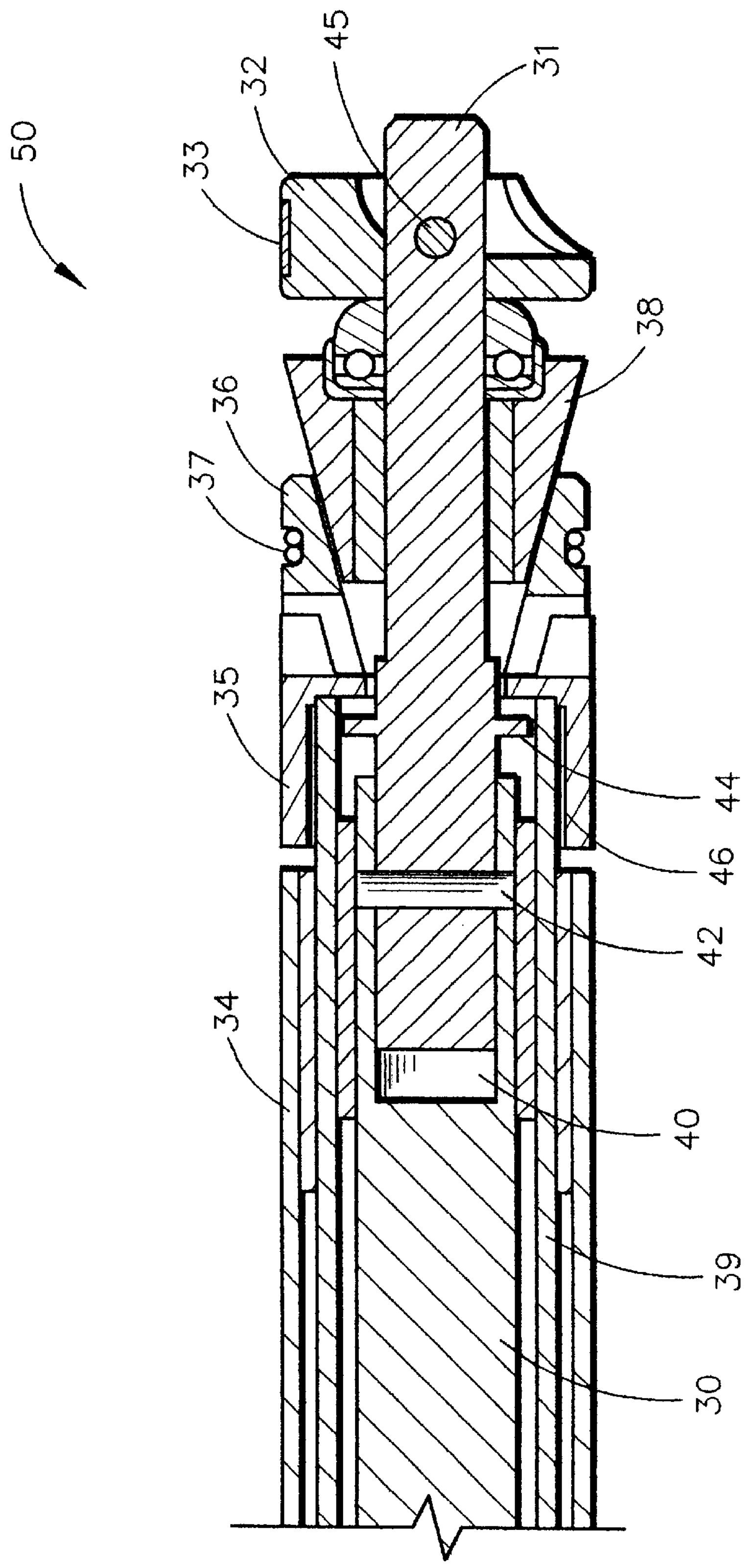
FIG. 3 is a sectioned elevational view of a second preferred embodiment of this invention.
Figure 4:
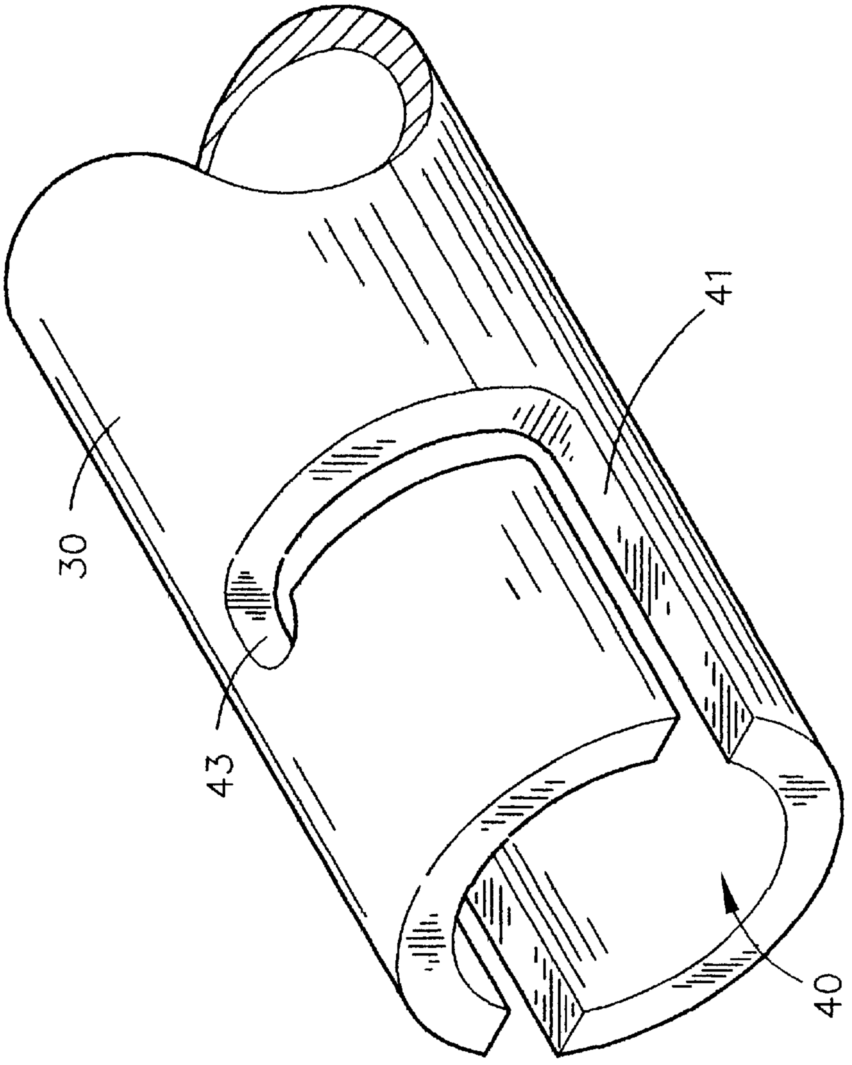
FIG. 4 is a perspective view of the j-groove configuration of a pull rod.

Referring now to FIGS. 3 and 4 wherein a preferred embodiment suitable for use with cores of small diameters is illustrated.

In this embodiment the non-rotating elements are; pull rod 30, core drive spindle 31, end cap 32, cutter pad 33, and mandrel sleeve 34. The rotating elements are; drive hub 35, grippers 36, resilient rings 37, cone element 38, and drive element 39. The operational sequences for core cutting are the same as described above in relation to FIGS. 1 and 2.

The distal end of pull rod 30 is provided with an axial bore 40 into which drive spindle 31 is insertable. As shown in detail in FIG. 4, the distal end of pull rod 30 is provided with j-grooves 41 into which pin 42 is insertable and then rotatable, and when released, the tension in rings 37 urges pin 42 into engagement in the terminal leg 43 of j-groove 41 thereby securing drive spindle 31 in place on the end of pull rod 30.

Shoulder 44 serves to maintain the elements of internal core drive assembly 50 on drive spindle 31 between shoulder 44 and end cap 32 which is secured in place on spindle 31 by means of pin 45. Internal drive element 39 of mandrel 1 extends beyond mandrel sleeve 34 as shown in FIG. 3. Drive hub 35 is maintained in rotational engagement with internal drive element 39 by means of translation parallel to the longitudinal axis of drive element 39.

Internal core drive assembly 50 is secured to the end of core cutter mandrel 1 by means of inserting the proximal end of spindle 31 into bore 40 of pull rod 30 and engaging drive hub 35 with key 46 and then pressing spindle 31 into bore 40 against the resilient resistance created by rings 37 until pin 42 reaches the bottom of j-groove 41, and then rotating spindle 31 until pin 42 reaches the terminal leg 43 of j-groove 41 and then releasing spindle 31 so that pressures generated by rings 37 urges pin 42 into locking engagement in the terminal leg 43 of j-groove 41. This mode of quick engagement and disengagement is sometimes referred to as a saber-lock coupling and is similar to that used with saber-lock flash light bulbs and sockets.

Figure 5:
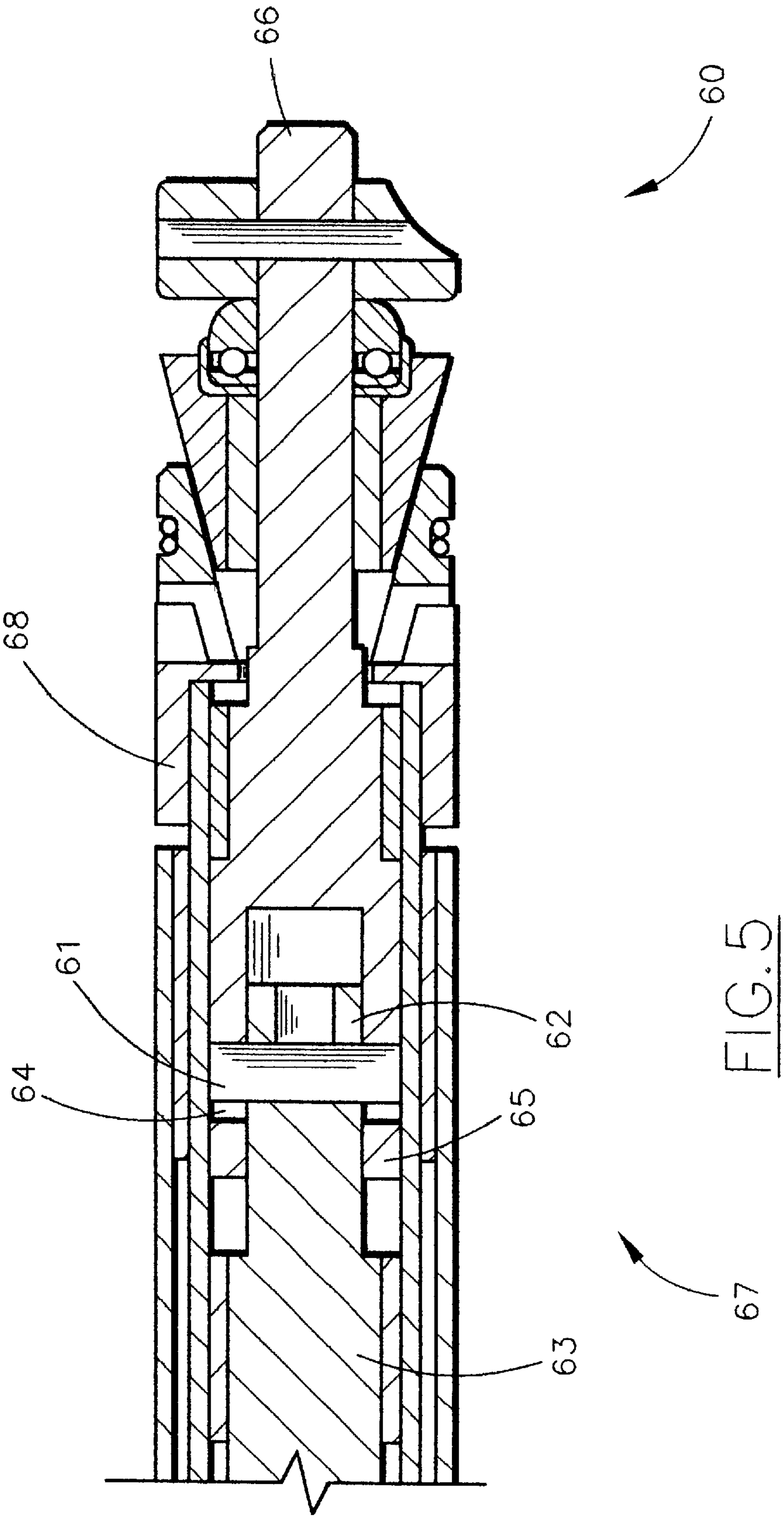
FIG. 5 is a sectioned elevational view of another embodiment of the core drive of this invention.

Referring now to FIG. 5 wherein another preferred embodiment of the core drive assembly of this invention is illustrated. Internal core drive assembly 60 is similar to that shown in FIGS. 3 and 4. The critical distinctions between core drive assembly 60 of FIG. 5 and core drive assembly 50 of FIG. 3 is in arrangement of the saber-lock configurations.

In core drive assembly 60, end 61 is secured to a cylindrical projection 62 of pull rod 63. A tubular end 65 of spindle 66 is provided with a j-groove 64 which functions the same as j-groove 41 of FIGS. 3 and 4 to provide a means for quickly attaching and releasing core drive assembly 60 from mandrel 67 of FIG. 5 and for guiding the rotating mechanisms of core drive assembly 60 into engagement with drive hub 68.

Broadly described, this invention is for a quick attachment and release core drive assembly for internal drive core cutters. The quick attachment and release features of the invention involve engaging rotating elements of the drive assembly with rotating elements of a core cutter mandrel, and the engagement of non-rotating members of the drive assembly with non-rotating members of the core cutter mandrel. These engagements involve quick attachment and detachment mechanisms that are of basic constructions and typically require no tools for their employment.

What is claimed is:

1. A quick change core drive for an internal drive core cutting mandrel comprising:

a) a core drive unit that is attachable and detachable as a unit to and from a mandrel of a core cutter wherein the mandrel provides a non-rotating central rod and a rotating drive element that rotates on the central rod and the core drive unit defines a central bore into which said central rod is insertable, and the core drive unit is provided with a first member of a male-female coupling means which is engageable with a mating second member of said male-female coupling means which is a part of the rotating drive element, and the core drive unit is provided with a means for releasably attaching the core drive unit to the central rod.

2. The core drive unit of claim 1 wherein the core drive unit is provided with a pusher which is rotatable on a mandrel of a core cutter to which the core drive unit is to be secured and the pusher is sized so as to support and permit the rotating of one end of a core to be cut.

3. The core drive unit of claim 2 wherein the pusher has at least one magnet as a part thereof and the magnet is configured so that when the pusher is in contact with the core drive unit, the pusher is magnetically coupled to the core drive unit.

4. A quick change core drive for an internal drive core cutting mandrel comprising:

a) a core drive unit that is attachable and detachable as a unit to and from a mandrel of a core cutter wherein the mandrel provides a non-rotating central rod and a rotating drive element that rotates on the central rod and the core drive unit defines a central bore into which said central rod is insertable, and the core drive unit is provided with a first member of a male-female coupling means which is engageable with a mating second member of the male-female coupling means which is a part of the rotating drive element, and the core drive unit is provided with a means for releasably attaching the core drive unit to the central rod, and wherein said first member of the male-female coupling means is engageable and disengageable with said second member of the male female coupling means by translating the core drive unit along the central rod.

5. The core drive unit of claim 4 wherein the male-member of said coupling is a head of a threaded fastener whose longitudinal axis is parallel to the longitudinal axis of the central rod and the female member of said coupling is a bore whose axis is parallel with the longitudinal axis of the central rod and alignable with the longitudinal axis of said threaded fastener.

6. A quick change core drive for an internal drive core cutting mandrel comprising:

a) a core drive unit that is attachable and detachable as a unit to and from a mandrel of a core cutter wherein the mandrel provides a non-rotating central rod and a rotating drive element that rotates on the central rod and the core drive unit defines a central bore into which said central rod is insertable, and the core drive unit is provided with a first member of a male-female coupling means which is engageable with a mating second member of the male-female coupling means which is a part of the rotating drive element, and the core drive unit is provided with a means for releasably attaching the core drive unit with the central rod, and said means for releasably attaching the core drive unit with the central rod is a pin which passes through the core drive unit and through said central rod so as to engage the core drive unit with the central rod and the pin is provided with a pulling means which permits the removal of the pin by hand.

7. A quick change core drive for an internal drive core cutting mandrel comprising:

a) a core drive unit that is attachable and detachable as a unit to and from a mandrel of a core cutter wherein the mandrel provides a non-rotating central rod and a rotating drive element that rotates on the central rod and the central rod is provided with a bore in the end of the central rod into which a spindle on which the core drive unit is mounted is insertable and secured and retained therein by means of a saber type coupling, and the core drive unit is engageable with the rotating drive element by means of a male-female coupling means.

8. A quick change core drive for an internal drive core cutting mandrel comprising:

a) a core drive unit that is attachable and detachable as a unit to and from a mandrel of a core cutter wherein the mandrel provides a non-rotating central rod and a rotating drive element that rotates on the central rod and said core drive unit is provided with a central spindle, said spindle defining a central bore into which said central rod is insertable and secured and retained therein by means of a saber type coupling and the core drive unit is engageable with the rotating drive element by means of a male-female coupling.

* * * * *